(12) United States Patent
Frohriep et al.

(10) Patent No.: US 11,247,585 B2
(45) Date of Patent: Feb. 15, 2022

(54) VEHICLE SEAT WITH OPERATING DEVICE

(71) Applicant: GRAMMER AG, Amberg (DE)

(72) Inventors: Susanne Frohriep, Amberg (DE);
Laurent Coppejans, Overijse (BE);
Jens Kolb, Königstein (DE)

(73) Assignee: GRAMMER AG, Ursensollen (DE)

( * ) Notice: Subject to any disclaimer, the term of this patent is extended or adjusted under 35 U.S.C. 154(b) by 252 days.

(21) Appl. No.: 16/510,421

(22) Filed: Jul. 12, 2019

(65) Prior Publication Data
US 2020/0016998 A1    Jan. 16, 2020

(30) Foreign Application Priority Data

Jul. 13, 2018  (DE) .......................... 102018116991.4

(51) Int. Cl.
| | | |
|---|---|---|
| *B60N 2/02* | (2006.01) | |
| *B60R 21/015* | (2006.01) | |
| *B60R 16/037* | (2006.01) | |
| *B60R 25/01* | (2013.01) | |

(52) U.S. Cl.
CPC .......... *B60N 2/0248* (2013.01); *B60R 16/037* (2013.01); *B60R 21/01554* (2014.10); *B60R 25/014* (2013.01); *B60N 2002/0268* (2013.01); *B60N 2002/0272* (2013.01)

(58) Field of Classification Search
CPC .......... B60N 2/0248; B60N 2002/0268; B60N 2002/0272; B60N 2/0228; B60N 2/90; B60R 21/01554; B60R 16/037; B60R 25/014; H01H 25/008
See application file for complete search history.

(56) References Cited

U.S. PATENT DOCUMENTS

| | | | |
|---|---|---|---|
| 6,936,935 B2 | 8/2005 | Dinkel et al. | |
| 9,079,514 B2 | 7/2015 | Haller | |
| 9,132,752 B2 | 9/2015 | Pleskot | |
| 2002/0104742 A1* | 8/2002 | Novelle | B60N 2/0228 |
| | | | 200/5 R |

(Continued)

FOREIGN PATENT DOCUMENTS

| | | |
|---|---|---|
| CN | 103386898 | 11/2013 |
| CN | 103723056 | 4/2014 |

(Continued)

OTHER PUBLICATIONS

Official Action for German Patent Application No. 102018116991.4, dated Mar. 25, 2019, 3 pages.

(Continued)

*Primary Examiner* — Russell Frejd
(74) *Attorney, Agent, or Firm* — Sheridan Ross P.C.

(57) ABSTRACT

The invention relates to a seat, in particular a vehicle seat, with an operating device for setting seat parameters, wherein the operating device comprises at least one multifunction operating element having at least one selection element, by means of which at least two operating levels can be selected, wherein the multifunction operating element is movable in at least five switching directions, wherein each switching direction can be assigned to a specific function which is associated with the selected operating level and changes a seat parameter.

17 Claims, 11 Drawing Sheets

(56) References Cited

U.S. PATENT DOCUMENTS

| | | | | |
|---|---|---|---|---|
| 2003/0023353 | A1* | 1/2003 | Badarneh | B62D 1/046 |
| | | | | 701/1 |
| 2004/0118664 | A1* | 6/2004 | DePue | G06F 3/0362 |
| | | | | 200/4 |
| 2006/0061177 | A1* | 3/2006 | Billger | B60N 2/0228 |
| | | | | 297/344.21 |
| 2010/0020028 | A1* | 1/2010 | Laurent | H01H 13/704 |
| | | | | 345/173 |
| 2010/0181814 | A1 | 7/2010 | Lachenmann et al. | |
| 2014/0095000 | A1* | 4/2014 | Waller | G06F 3/1454 |
| | | | | 701/2 |
| 2016/0236591 | A1 | 8/2016 | Lange-Mao et al. | |
| 2016/0355111 | A1 | 12/2016 | Randleman et al. | |
| 2018/0029502 | A1 | 2/2018 | Georgiev et al. | |
| 2019/0241071 | A1* | 8/2019 | Trabucco | E05F 15/60 |
| 2020/0019301 | A1* | 1/2020 | Kolb | B60N 2/0228 |

FOREIGN PATENT DOCUMENTS

| | | |
|---|---|---|
| CN | 203592903 | 5/2014 |
| DE | 19725175 | 12/1998 |
| DE | 19946021 | 11/2000 |
| DE | 19952560 | 5/2001 |
| DE | 10037830 | 2/2002 |
| DE | 10061346 | 6/2002 |
| DE | 10124246 | 11/2002 |
| DE | 10242236 | 4/2004 |
| DE | 10341162 | 4/2005 |
| DE | 102009009501 | 8/2010 |
| DE | 102010013014 | 9/2011 |
| DE | 102012214295 | 2/2014 |
| DE | 202016101747 | 4/2016 |
| DE | 102015213995 | 1/2017 |
| DE | 102016011307 | 3/2018 |
| EP | 0674594 | 3/1998 |
| EP | 1659020 | 5/2006 |
| EP | 2163420 | 3/2010 |
| EP | 2735469 | 5/2014 |
| EP | 3521107 | 8/2019 |
| GB | 2535535 | 8/2016 |
| JP | H03-178839 | 8/1991 |
| WO | WO 2012/082052 | 6/2012 |
| WO | WO 2015/136901 | 9/2015 |

OTHER PUBLICATIONS

Extended Search Report for European Patent Application No. 19185440.5, dated Dec. 2, 2019, 3 pages.

Official Action with English Translation for China Patent Application No. 201910636622.6, dated Jun. 30, 2021, 23 pages.

Official Action with English Translation for China Patent Application No. 201910637091.2, dated Jul. 1, 2021, 24 pages.

Official Action for U.S. Appl. No. 16/510,252, dated Jul. 21, 2021 13 pages.

Official Action for German Patent Application No. 102018117000.9, dated Mar. 15, 2019, 3 pages.

Extended Search Report for European Patent Application No. 19185430.6, dated Jan. 10, 2020, 3 pages.

* cited by examiner

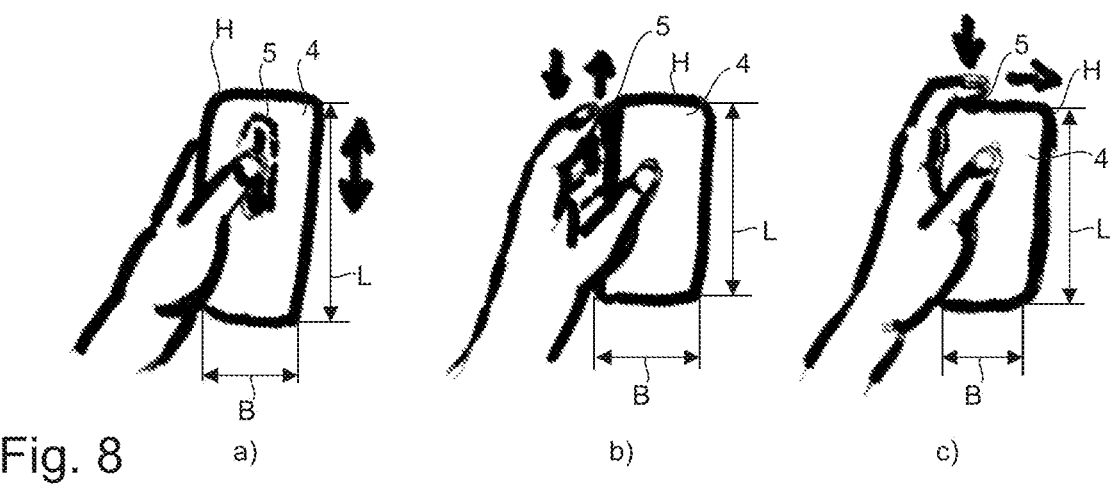
Fig. 8  a)  b)  c)
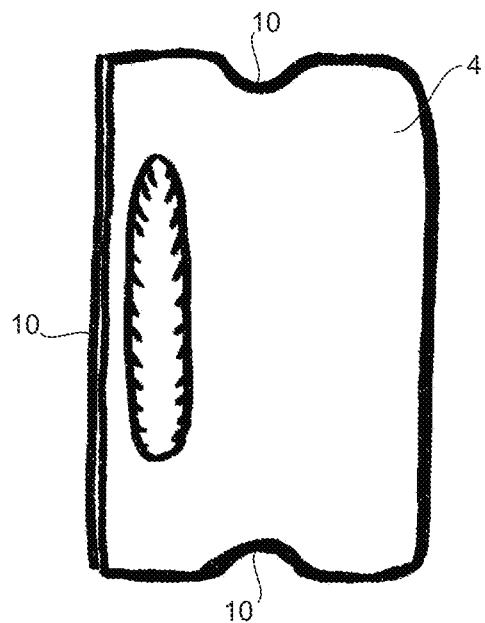
Fig. 9
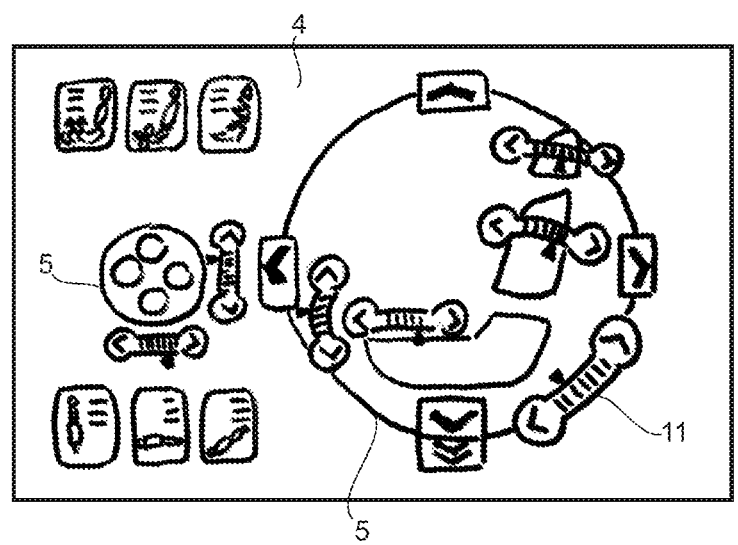
Fig. 10

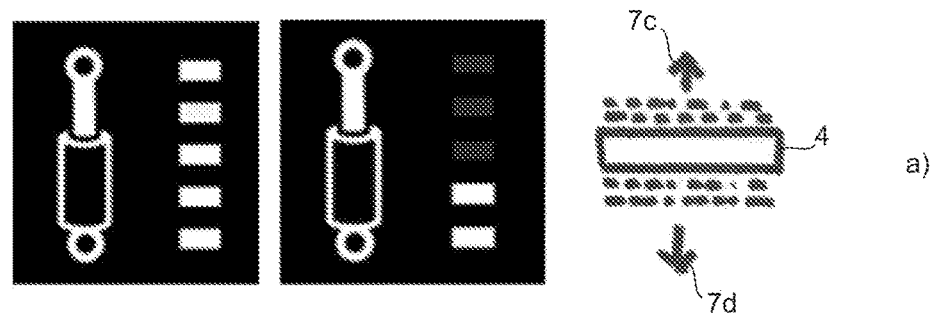
Fig. 18
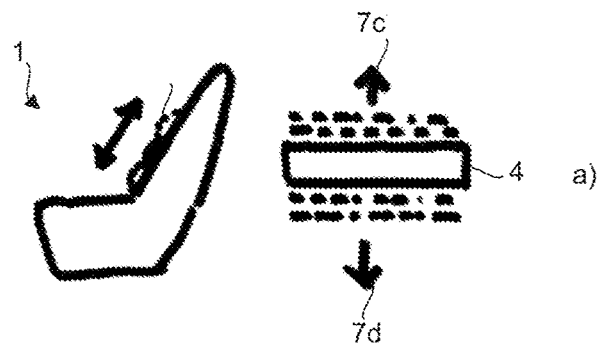
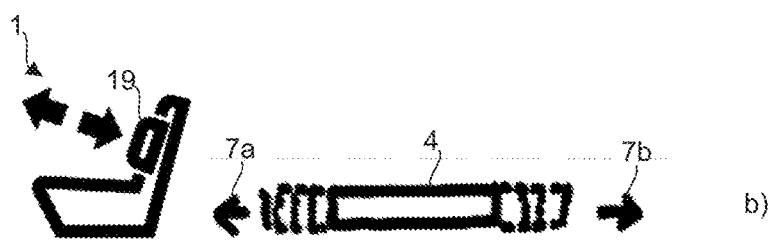
Fig. 19
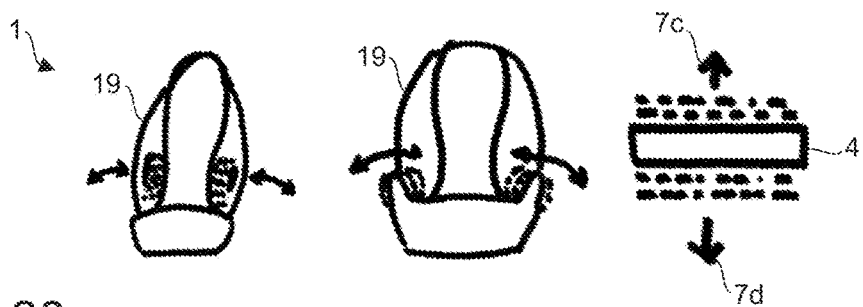
Fig. 20

VEHICLE SEAT WITH OPERATING DEVICE

CROSS-REFERENCE TO RELATED APPLICATIONS

This application claims the benefit of German Patent Application No. DE 10 2018 116 991.4 filed Jul. 13, 2018, the entire disclosure of which is incorporated herein by reference.

FIELD

The invention relates to an operating device for setting seat parameters of a seat, in particular a vehicle seat. Furthermore, the invention relates to a seat, in particular a vehicle seat, with an operating device for setting seat parameters.

BACKGROUND

In motor vehicles, especially in commercial vehicles, such as tractors or trucks, it is important to offer the driver the highest possible seating comfort because of the sometimes long travel times. To make this possible, the drivers can set a variety of seat parameters according to their needs. Such seat parameters may be, for example, the seat height, the seat position in the longitudinal direction (X), the position and orientation of individual components of the seat, such as the backrest, headrest, seat cushion section, or even adjustment of a spring and/or cushioning device. Furthermore, corresponding seat parameters may relate to a seat comfort device, for example a seat air conditioning device, a seat shape adjustment device or a massage device.

Usually, a corresponding actuating part, such as a switch or a push button, is provided for setting each seat parameter. This has the consequence that a large number of such actuators is necessary, whereby on the one hand, the operation becomes confusing for the driver, and on the other, a large amount of space is taken.

SUMMARY

The object of the invention is therefore to enable the operation of a variety of seat parameters in a manner which is both clear for the operator and which saves space.

This object is achieved by an operating device for setting seat parameters of a seat, in particular of a vehicle seat, which is characterized in that the operating device comprises at least one multifunction operating element, which has at least one selection element, by means of which at least two operating levels can be selected, wherein the multifunction operating element is movable in at least five switching directions, wherein each switching direction can be assigned to a specific function, which belongs to the selected operating level and changes a seat parameter.

In the following, the operating device will be described in connection with a seat. This should not be intended as a limitation. Other applications for setting a wide variety of parameters would also be conceivable.

According to a particularly preferred embodiment, the multifunction operating element is connected to the seat such that a movement according to the invention is made possible. By the selection element, a specific operating level can be selected, which comprises a function group, for example, the adjustment of the seat parameters for a particular component of the seat. Due to the fact that by means of the multifunction operating element a plurality of operating levels, which may include multiple functions, can be operated, a variety of individual switches and buttons may be dispensed with. A considerable amount of space is thereby saved. Manufacturing costs are also reduced because fewer components must be installed. Finally, the user is presented with a straightforward operation, since one no longer needs to search for the relevant switch or button, because different parameters are controlled by one actuator. "Seat parameters" are understood to mean all settings of a seat or devices associated with the seat. However, such a seat parameter can also be understood to mean settings of other devices of the vehicle.

According to a preferred embodiment, the operating device comprises a single multifunction operating element. By means of this single multifunction operating element, a plurality of seat parameters can be set.

According to a further preferred embodiment, the operating device comprises two or a plurality of multifunction operating elements. These multifunction elements may have the same operating levels with the associated functions to choose from. The users are thus given the opportunity to access differently accessible locations of the seat to change the corresponding seat parameters. These seat parameters can thus be conveniently changed in different driving situations.

However, it would also be conceivable that the different multifunction operating elements have different operating levels, whereby a distribution of the operating levels into similar changes in the seat parameters is possible. This may be advantageous when there is a large number of operating levels.

The following only refers to one multifunction operating element. Of course, however, in the case where the operating device has two or a plurality of multifunction operating elements, the further multifunction operating elements may have the corresponding features.

According to a particularly preferred embodiment, the multifunction operating element is movable in six switching directions. Preferably, the multifunction operating element has three axes of movement. Preferably, two opposite switching directions are oriented along each movement axis (X, Y, Z).

Preferably, a first and a second switching direction correspond to a translational movement of the multifunction operating element along a first movement axis (X) in opposite directions. The multifunction operating element can thus be moved by pulling or pushing along the first or second switching direction. Preferably, the first movement axis (X) extends along the horizontal longitudinal direction (X1) of the seat. A displacement of the seat along this longitudinal direction (X1) thus corresponds to the change in the distance of the seat to the operating elements of the vehicle in the longitudinal direction.

According to a further preferred embodiment, a third and a fourth switching direction correspond to a translational movement of the multifunction operating element along a second movement axis (Z) in respectively opposite directions. Alternatively, the third and the fourth switching direction correspond to a rotational movement of the multifunction operating element about the first movement axis (X) in opposite directions. Preferably, the second movement axis (Y) extends along the height direction (Z1) of the seat and is perpendicular to the first movement axis (X). Both a translational movement of the multifunction operating element along the second movement axis (Z) and a rotational movement of the multifunction operating element about the first movement axis (X) means an up or down movement of the multifunction operating element for the person in the seat. Preferably, the pivot point is close to the seat to allow for a slight rotational movement of the multifunction operating element.

According to a further preferred embodiment, a fifth and a sixth switching direction correspond to a rotational movement of the multifunction operating element about the third movement axis (Y) in respectively opposite directions. Preferably, the third movement axis (Y) extends along the width direction (Y1) of the seat and is perpendicular to the first movement axis (X) and the second movement axis (Z). The pivot point may be arranged centrally, off-centre of the multifunction operating element. Alternatively, the pivot point could be located at a front or a rear end of the multifunction operating element. According to the arrangement of the pivot point, different types of inclination of the multifunction operating element result.

According to a further preferred embodiment, the multifunction operating element comprises a reset unit, so that the multifunction operating element can be displaced into its initial position by means of the reset unit after a deflection along a certain switching direction after a predetermined time. Such a reset unit could be a spring element, an elastic element or an actuator which is operated electrically, pneumatically, or hydraulically.

According to a preferred embodiment, an operating level can be selected and a specific function can be operated directly by means of the at least one selection element. The user may thus set the desired settings of the seat parameters directly by a corresponding movement of the multifunction operating element along the switching directions and by means of the selection element.

According to a particularly preferred embodiment, the selection element is a touch screen for displaying and selecting at least two control panels. Preferably, one control panel represents one operating level. Preferably, a control panel can be selected by means of at least one first user input.

Furthermore, it is advantageous if the touch screen displays a single control panel at a time. Thus, by means of the touch screen, always exactly one control panel assigned to a specific operating level is displayed. The function associated with the operating level can then be operated by a corresponding movement of the multifunction operating element.

Alternatively or cumulatively, the function can be operated by means of a second user input by the touch screen. For this purpose, the control panel may have a plurality of control sub-panels, by means of which the respective functions can be operated.

Advantageously, the first and the second user input are different from each other.

Preferably, the control panels are arranged in a fixed sequence. A fixed sequence is advantageous in that through the at least one first user input the driver can toggle without eye contact between the control panels and reach the desired control panel after a certain number of first user inputs. Furthermore, the sequence may be designed such that the more frequently used control panels or operating levels are at the beginning of the sequence and the less frequently used ones are at the end.

According to a further preferred embodiment, the user input is a swiping or a tapping movement. Preferably, the first user input is a swiping movement and the second user input is a tapping movement.

In particular, the swiping movement is a movement on the screen, particularly advantageously along a horizontal line of the screen, that is to say, simply a movement from left to right or vice versa.

The tapping movement is made to the corresponding operating sub-fields, which is or are one or several sensitive key areas on the control panel. If a tapping movement is executed on one of the key areas, the seat parameter is changed depending on this input.

According to a further preferred embodiment, the operating device comprises a control unit which receives a control signal from the multifunction operating element. Preferably, at least one actuator and/or at least one spring and/or cushioning device and/or at least one seat comfort device can be controlled by means of the control unit.

Preferably, the actuator changes the seat parameters with respect to the position and/or orientation of the entire seat or at least one component.

According to a further preferred embodiment, after the selection of an operating level, an identification signal can be transmitted from the touchscreen to the control unit after a predetermined first duration. After receiving the identification signal, the control unit preferably briefly activates an actuator assigned to the operating level.

This means that after a selection of a control panel and after a predetermined first duration, an identification signal is transmitted from the touch screen to the control unit, wherein the control unit informs the control unit by means of the identification signal which operating level is currently selected. After the control unit has received this identification signal and has been informed which operating level is selected, the control unit transmits an activation signal to the actuator associated with the selected operating level, whereby the actuator is briefly activated.

Briefly means a duration of less than 5 seconds, more preferably less than 2 seconds, and particularly preferably not more than 1 second, and more preferably not more than 0.5 seconds.

This brief activation creates additional feedback for the driver, so that the driver can recognize without eye contact to the touch screen which control panel is currently selected and, in particular, which seat parameter can be set thereby.

According to a further preferred embodiment, the operating device can be deactivated manually.

According to a further preferred embodiment, the operating device is automatically deactivated after a predetermined second duration. Accordingly, it is advantageous that after a predetermined second duration a deactivation signal is sent to the touch screen by the control unit, whereby the touch screen is automatically deactivated.

This means that if the driver does not want to make any more adjustments or has already made all adjustments to the vehicle seat, the touch screen is automatically deactivated and therefore cannot be operated unintentionally. In particular, the driver does not have to perform any manual deactivation of the touch screen, so that increased comfort in the operation of the seat operating device can be ensured.

The second duration is preferably not more than 5 minutes, more preferably 2 minutes and particularly preferably not more than 1 minute.

Preferably, the operating device can be activated by a movement of the multifunction operating element. For this purpose, it may be provided that a movement in any switching direction is necessary for activation. Alternatively, it can be provided that a movement in a predetermined switching direction is necessary for activation.

Alternatively, an activation element may also be provided by means of which the operating device can be activated. The activation element unlocks the touch screen, thereby displaying a first control panel on the touch screen. Such an activation element is particularly advantageous when the touch screen and accordingly the control panels are arranged in environments in which an inadvertent touch or actuation by the driver cannot be precluded. However, if the touch screen is located in an environment in which such inadvertent operation by the driver may be precluded or nearly precluded, an activation element may be dispensed with, and the operating device is active at least during use of the vehicle or vehicle seat.

The activation element may be designed as part of the touch screen. In particular, the activation element is haptically distinguishable from the sensitive area of the touch screen. However, the activation element may also be designed as another switch or button.

According to a further preferred embodiment, the operating device is constantly activated. Constantly activated is understood to mean that the operating device is active as long as the vehicle and/or the vehicle seat are actively used. If the vehicle is deactivated or the vehicle seat is not occupied, the seat operating device is likewise deactivated.

According to a further preferred embodiment, the first control panel is displayed on the touch screen after a predetermined third duration. Preferably, after the predetermined third duration, the control unit sends a reset signal to the touch screen, thereby displaying the control panel displayed first.

After activation of the seat operating device, regardless of how it was activated, a first control panel is initially displayed in the predetermined order of the control panels on the touch screen. Such a first control panel may be assigned to an operating level which is used more frequently than the others.

In this case, the third duration is preferably at least one minute, preferably at least 2 minutes, more preferably at least 5 minutes and particularly preferably at least 10 minutes.

According to a further preferred embodiment, the operating unit is connectable with another mobile device by means of a wireless technology, so that a data exchange is enabled. Such a mobile device may be a mobile phone, a smartphone, a tablet or a laptop. Of course, the present invention is not limited to this list and other similar data processing equipment may be considered for the application. Such a wireless technology may be, for example, Bluetooth, NFC (Near Field Communication) technology, RFID (Radio Frequency Identification) or Wireless LAN.

A diagnosis of the seat function can be made, for example, by means of the data exchange. Furthermore, software updates can be performed in a simple way. It would also be conceivable to retrieve usage records for the seat or maximum load protocols of the vehicle driver.

According to a further preferred embodiment, after the selection of an operating level or the actuation of a function by the multifunction operating element, a confirmation signal can be presented to the user. Preferably, the confirmation signal is a haptic signal. Such a haptic signal may be, for example, a vibration of the multifunction operating element. However, optical or acoustic confirmation signals would also be conceivable.

According to a further preferred embodiment, the multifunction operating element is designed tabular. The multifunction element may thus have dimensions comparable to conventional smartphones. Preferably, the multifunctional element has a length in a range of 5 cm to 15 cm, a width in a range of 3 cm to 10 cm and a height in a range of 0.5 cm to 3 cm. On the one hand, such an embodiment offers an optimal gripping surface for the user and, on the other hand, the multifunctional element does not take up an excessive amount of space.

According to a further preferred embodiment, the multifunction element is equipped with haptic elements and/or a grip layer. Such a grip layer may be, for example, a rubberized layer or a layer with a roughened surface. This ensures a safe and comfortable grip of the multifunction element.

Preferably, the one selection element is arranged on a surface of the multifunction operating element. Preferably on a surface bounded by the length and width of the multifunction operating element. An arrangement on a lateral surface, i.e. a surface which is bounded by the height and the width of the multifunction operating element or a surface which is bounded by the height and the length of the multifunction operating element is also conceivable. In an embodiment of the selection element as a touch screen, only the arrangement on a surface which is bounded by the length and the width of the multifunction operating element makes sense.

According to a further preferred embodiment, the multifunction operating element is provided with at least one identification element, by means of which the switching directions can be identified. Such identification elements may, for example, be recesses at the front and rear end of the multifunction operating element, which may serve to identify the first and second switching directions (pull/push).

Furthermore, recesses may be provided on the top and bottom of the multifunction operating element, which may serve to identify the third and fourth switching directions (pull up/push down). The top and bottom are the opposing surfaces bounded by the length and width of the multifunction operating element.

To identify the fifth and the sixth switching direction, alternatively shaped recesses may likewise be provided on the top and bottom of the multifunction operating element. Furthermore, it would be possible to form a corresponding shape of the multifunction operating element according to the finger position during the rotational movement in the fifth and the sixth switching direction as an identification element. Furthermore, elevations, protrusions or otherwise designed haptic elements would also be suitable as identification elements.

According to a further preferred embodiment, illumination is provided on the multifunction operating element. This illumination may be provided for the entire multifunction operating element or only for individual elements such as the identification elements or the at least one selection element. Thus, for example, the touch screen may have backlighting to illuminate the touch screen. The illumination may be an active illumination by means of conventional lamps or LEDs or may comprise a luminescent material.

In a preferred embodiment, the touch screen is illuminated as long as it is activated. Preferably, the illumination can be activated automatically when a certain brightness value, which is measured by a sensor, is not reached. More preferably, the illumination can be activated manually. More preferably, the activation of the illumination can be based on the time.

According to a further preferred embodiment, both an operating level can be selected and a specific function can be operated directly by means of the at least one selection element. The selection element could also be designed as a touch screen. Users can thus adjust the desired settings of the seat parameters directly with a corresponding movement of the multifunction operating element along the switching directions and directly by means of the selection element.

According to a further preferred embodiment, one operating level is assigned to a communication device. This could be, for example, a hands-free device. Preferably, an operating level is assigned to specific vehicle settings. Such vehicle settings may relate to, for example, the interior lighting, the operation of a radio or the like. Thus, it is also possible to operate elements which have no relation to the seat.

The underlying object of the invention is further achieved by a seat, in particular vehicle seat, with an operating device for setting seat parameters according to one of the previously described embodiments.

According to a further preferred embodiment, the multifunction operating element is arranged on the seat cushion section and/or on an armrest. Preferably, the multifunction operating element is arranged on a lateral section of the seat cushion section and/or the armrest. Lateral section is understood to mean those sections which are located at the lateral boundaries in the width direction (Y1) of the seat cushion part or the armrest. Such an arrangement is particularly easy for a user to access.

According to a further preferred embodiment, the seat comprises the components seat cushion section, backrest, headrest and at least one armrest. Preferably, an operating level is assigned to the entire seat or at least one component. In this case, the seat parameter changed by a specific function preferably corresponds to a change in the position of the entire seat or at least of one component. The seat parameter changed by a specific function preferably corresponds to the orientation of the entire seat or of at least one component. In this case, a change in orientation corresponds to a change in the inclination of the entire seat or of a particular component.

Possible changes to the seat parameters for the entire seat may thus be: displacement along the longitudinal direction (X1) or adjustment of the seat spacing, displacement along the height direction (Z1) or adjustment of the seat height and rotational movement about an axis along the width direction (Y1) or adjustment of the seat tilt. Similarly, the armrest, the headrest and the seat cushion can be displaced along the longitudinal direction (X1) and the height direction (Z1) and thus the height or the position can be adjusted. Furthermore, armrest and headrest and seat cushion section can all be changed in their inclination. Finally, the length of the seat cushion section can be changed.

According to a further preferred embodiment, a specific switching direction of a function of a first operating level is assigned to a change in a seat parameter of a first element, which may be the entire seat or a component, with respect to a particular seat direction (X1, Y1, Z1) and the same switching direction of a function of at least one further operating level is assigned to a change in a seat parameter of a second element, which may be the entire seat or a component with respect to a same seat direction (X1, Y1, Z1). The seat directions are the longitudinal direction (X1), the width direction (Y1) and height direction (Z1).

Accordingly, the entire seat could, for example, be assigned to the first operating level. The seat height could then be adjustable with movements of the multifunction operating element along the third and fourth switching directions (pull up/push down). A selection of at least one further operating level could then relate to the headrest. Accordingly, a corresponding height setting could be adjusted by a movement of the multifunction operating element along the same third and fourth switching directions (pull up/push down). Thus, all height settings of the entire seat and individual components, all inclination settings and all displacement settings can be performed along a specific seat direction (X1, Y1, Z1). This simplifies the operability of the individual adjustment of the seat parameters, since the user only has to memorize the corresponding switching directions for a certain type of parameter changes and only select the corresponding component.

According to a further preferred embodiment, movement of the multifunction operating element in a switching direction with respect to a movement axis (X, Y, Z) causes a similar change in the position and/or orientation of the entire seat or at least one component with respect to a seat direction (X1, Y1, Z1) parallel to one of the axes of movement (X, Y, Z). Thus, for example, a height setting, which is a displacement of the entire seat or a component along the height direction (Z1), may correspond to the third or fourth switching direction which is moved with respect to the second movement axis (Z). Furthermore, a displacement of the entire seat or of a component in the longitudinal direction (X1) by a movement of the multifunction operating element can take place along the first or second switching direction. Similarly, an inclination of the entire seat or of a component can be caused by a similar inclination of the multifunction operating element. The user can thus intuitively make the desired setting without first having to memorize corresponding switching directions.

According to a further preferred embodiment, the operating device comprises a control unit, which receives a control signal from the multifunction operating element and controls at least one actuator, which changes the parameters with respect to the position and/or orientation of the entire seat or at least one component correspondingly. Suitable actuators are usually pneumatic, hydraulic, or electrically operated actuators. However, the use of other actuators is also possible.

According to a further preferred embodiment, an operating level is associated with at least one spring and/or cushioning device, which acts in the vertical and/or horizontal direction. The associated functions of the operating level preferably correspond to the parameter settings of the spring and/or cushioning device. Accordingly, by means of a movement of the multifunction operating element along a switching direction, for example, the hardness of the spring and/or cushioning device or other parameter of this device can be changed. Preferably, the spring and/or cushioning device, which acts in the vertical direction, is assigned to a different operating level than the spring and/or cushioning device, which acts in the horizontal direction. Preferably, the operating device comprises a control unit, which receives a control signal from the multifunction operating element and controls the at least one spring and/or cushioning device.

According to a further preferred embodiment, an operating level is associated with at least one seat comfort device. The associated functions of the operating level preferably correspond to the parameter settings of the seat comfort device. Preferably, a seat comfort device may be a seat air conditioning device, in particular a seat heater or a seat ventilation. Preferably, the seat comfort device may be a seat shape adjustment device. A seat shape adjustment device may be, for example, an adjustment of the side cushions on the seat section, an adjustment of the side bolsters on the backrest, an adjustment of the shape of the armrest or a change in the lumbar support. The changes in the lumbar support may be a shift of the lumbar support peak curvature up or down, or a change in the curvature of the lumbar support. Furthermore, a seat comfort device could be a massage device. Preferably, the operating device comprises a control unit which receives a control signal from the multifunction operating element and controls the at least one seat comfort device.

BRIEF DESCRIPTION OF THE DRAWINGS

Further advantages, aims and properties of the present invention are explained with reference to the following description of the attached drawings. Similar components may have the same reference signs in the various embodiments.

In the drawings:

FIGS. 8 a-c show a view of the multifunction operating element according to further embodiments;

FIG. 9 shows a view of the multifunction operating element according to a further embodiment;

FIG. 10 shows a view of the multifunction operating element according to a further embodiment;

FIGS. 14 to 22 show a schematic illustration of a change to a seat parameter with the associated switching directions;

DETAILED DESCRIPTION

Figure 1:
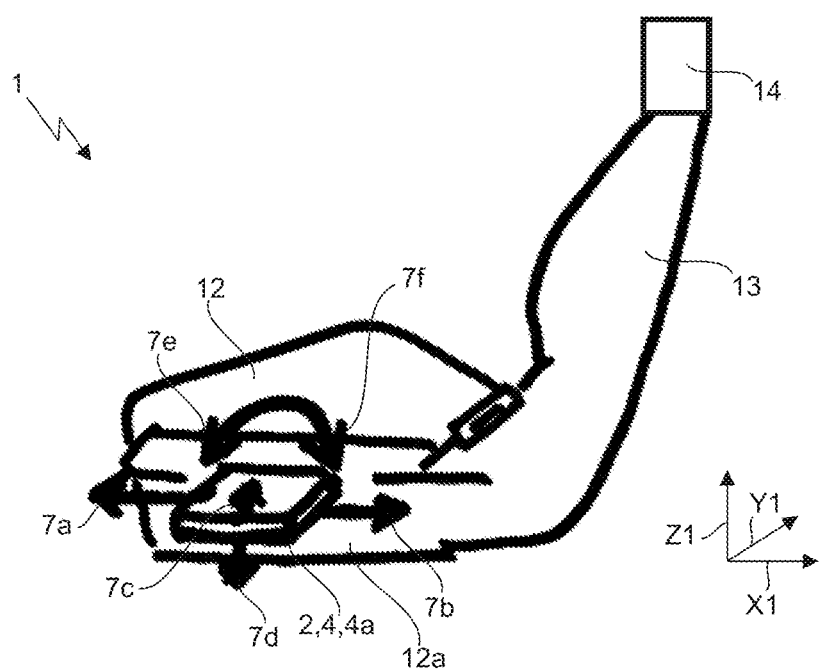
FIG. 1 shows a side view of a seat with an operating device.
Figure 4:
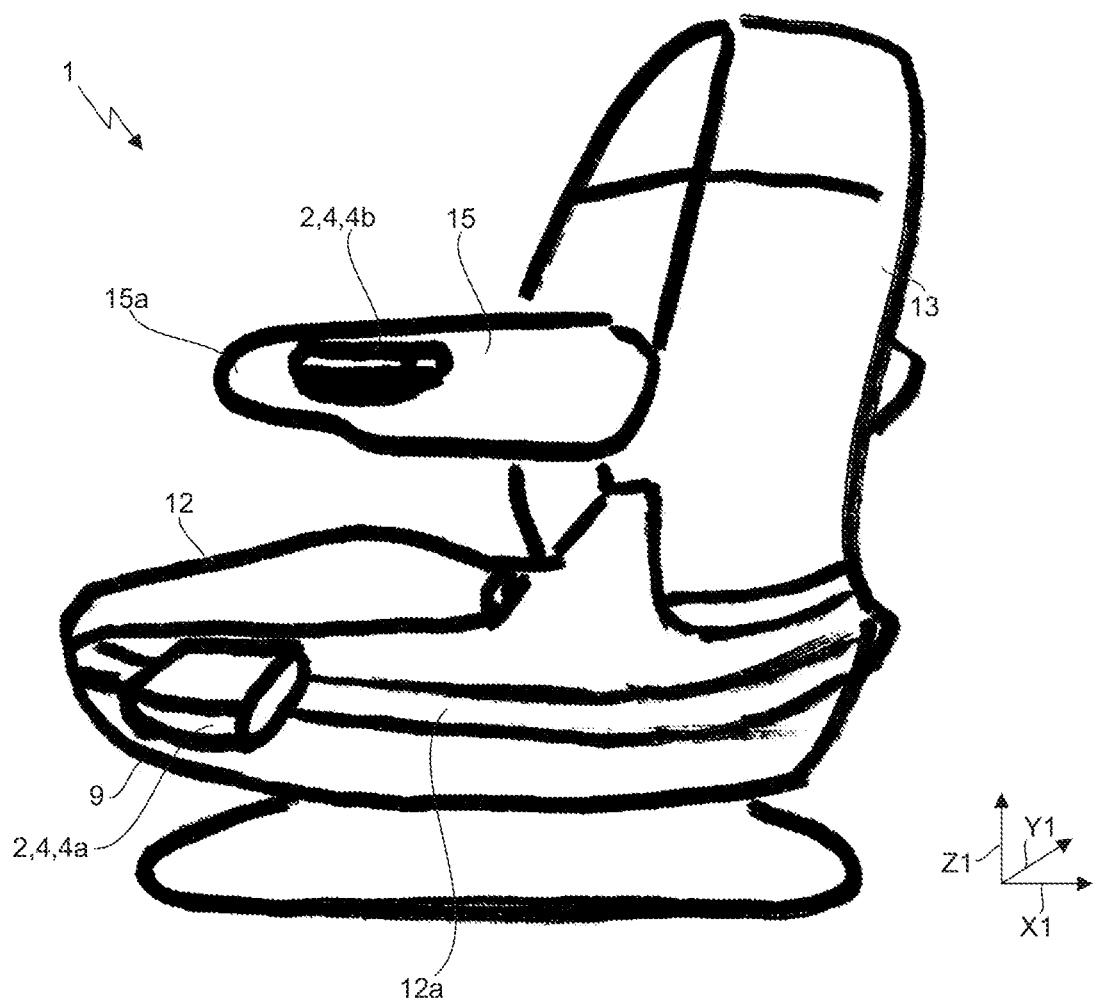
FIG. 4 shows a side view of a seat with an operating device according to a further embodiment.
Figure 6:
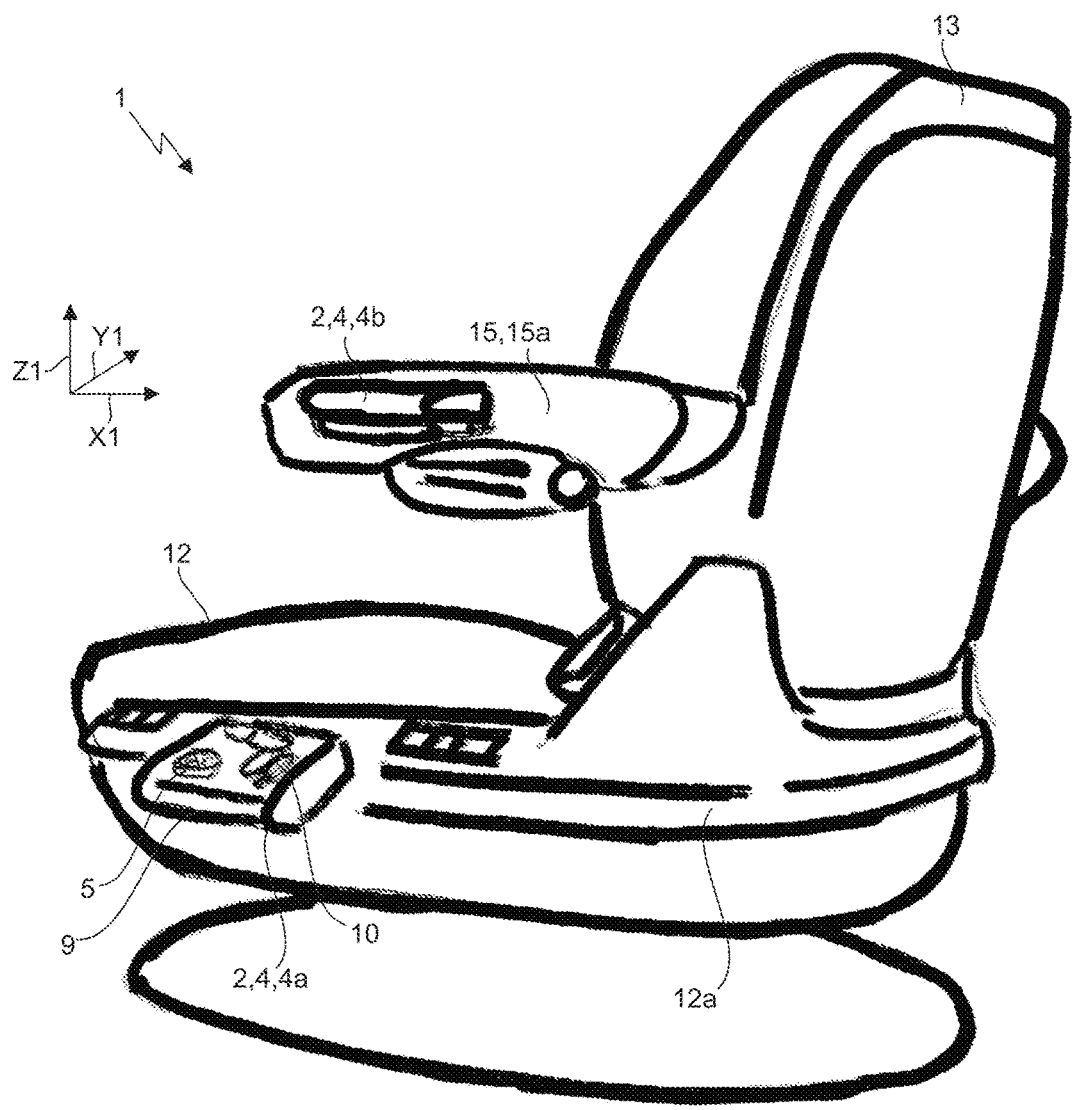
FIG. 6 shows a side view of a seat with an operating device according to a further embodiment.

FIGS. 1, 4 and 6 show a seat (1), in particular a vehicle seat. The seat (1) comprises the components seat cushion section (12), backrest (13), headrest (14) and at least one armrest (15). The seat is oriented along the seat directions (X1, Y1, Z1). These seat directions are the longitudinal direction (X1), the width direction (Y1) and the height direction (Z1).

The seat (1), in particular the vehicle seat is equipped with an operating device (2) for setting seat parameters (3), wherein the operating device (2) comprises at least one multifunction operating element (4) comprising at least one selection element (5), by means of which at least two operating levels (6) can be selected, wherein the multifunction operating element (4) can be moved in at least five switching directions (7), preferably six switching directions (7), wherein each switching direction can be assigned to (7) a certain function (8), which is associated with the selected operating level (6) and which changes a seat parameter (3).

Figure 13:
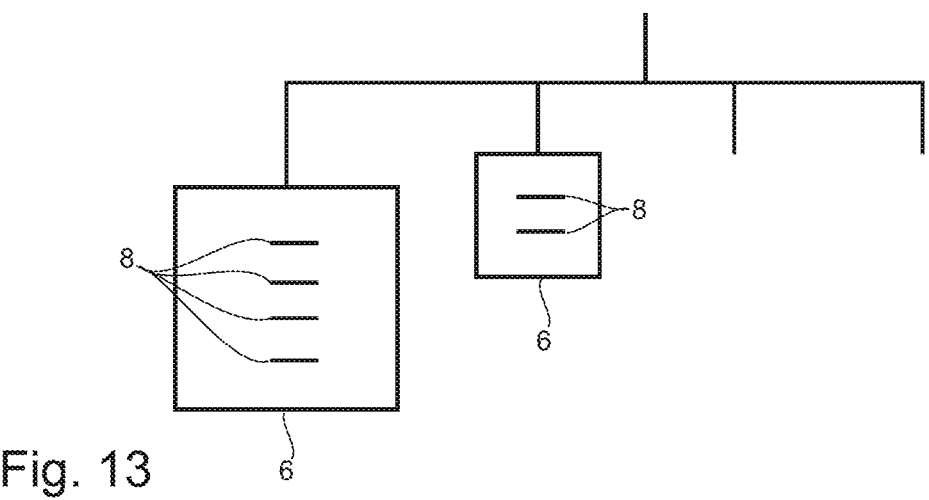
FIG. 13 shows a schematic functional overview of an operating level.
Figure 14:
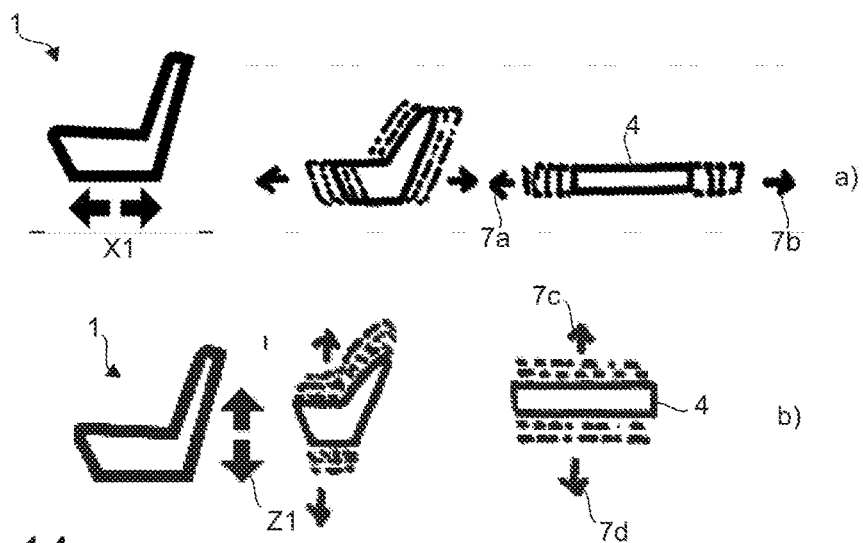

With the selection element (5), a certain operating level (6) is selected, which comprises a group of functions, for example, the adjustment of the seat parameters (3) for the entire seat (1) or a specific component (12, 13, 14, 15) of the seat (1). A corresponding overview is shown in FIG. 13.

Alternatively, both an operating level (6) can be selected and a specific function (8) can be operated directly by means of the at least one selection element (5).

Figure 12:
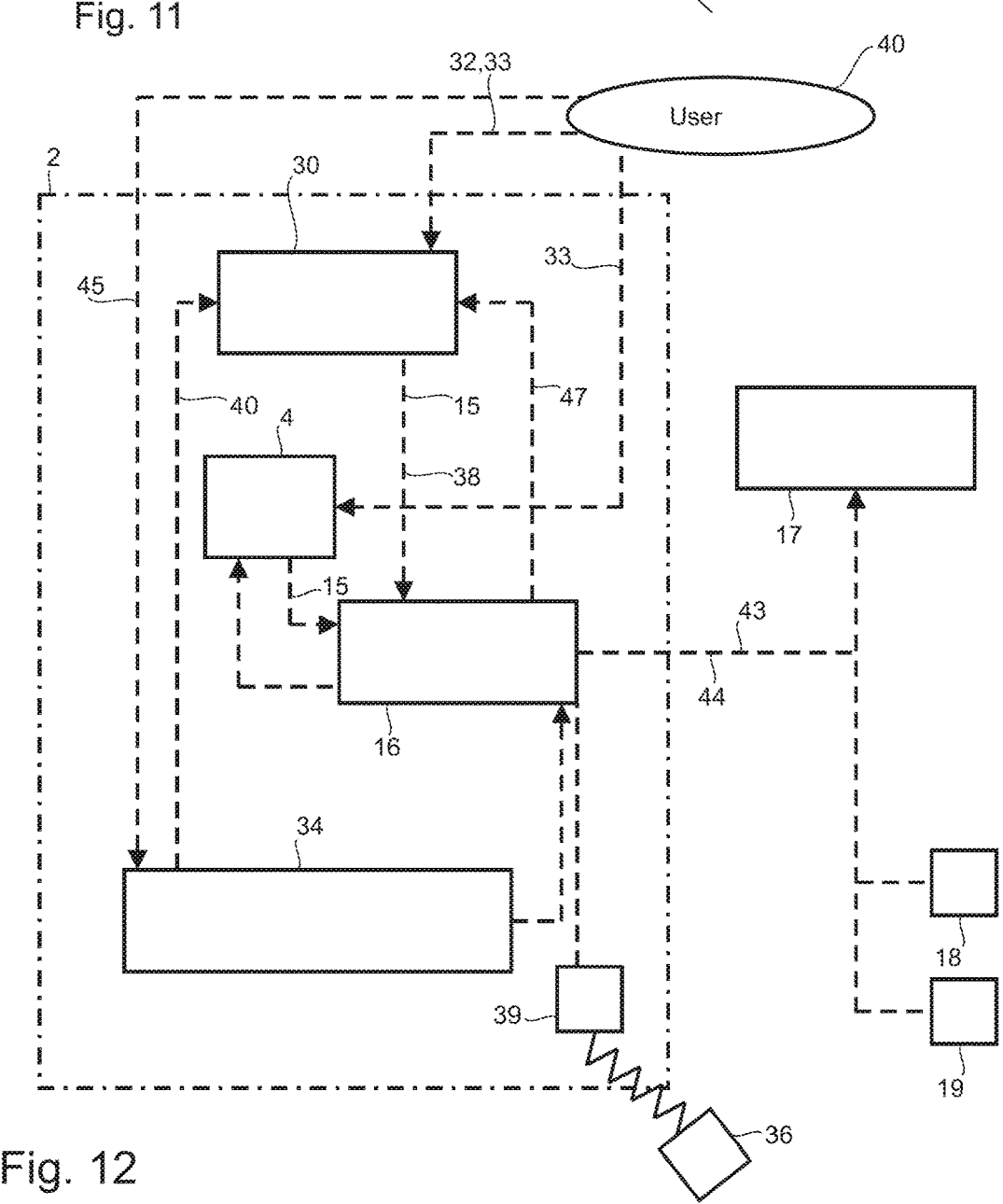
FIG. 12 shows a schematic functional overview of the operating device.

The operating device (6) comprises a control unit (16) which receives a control signal (16) from the multifunction operating element (4). Furthermore, a corresponding selection signal or a control signal of the selection element (5) is received, as shown in FIG. 12. The control unit (16) then controls the corresponding devices to change the seat parameters (3) accordingly. Such devices are actuators (17), one or a plurality of spring and/or cushioning device(s) (18) or one or a plurality of seat comfort device(s) (19).

The at least one multifunction operating element (4) may be arranged on a lateral section (12a) of the seat cushion section (12). This can be seen in FIGS. 1, 4, 5 and 6, for example. Furthermore, the multifunction operating element (4) may be arranged on a lateral section (15a) of the armrest (15). The respective lateral section is located at the lateral boundary of the seat cushion section (12) or the armrest (15) in the width direction (Y1) of the seat (1).

In this case, the multifunction operating element (4) is designed in a tabular form.

Figure 5:
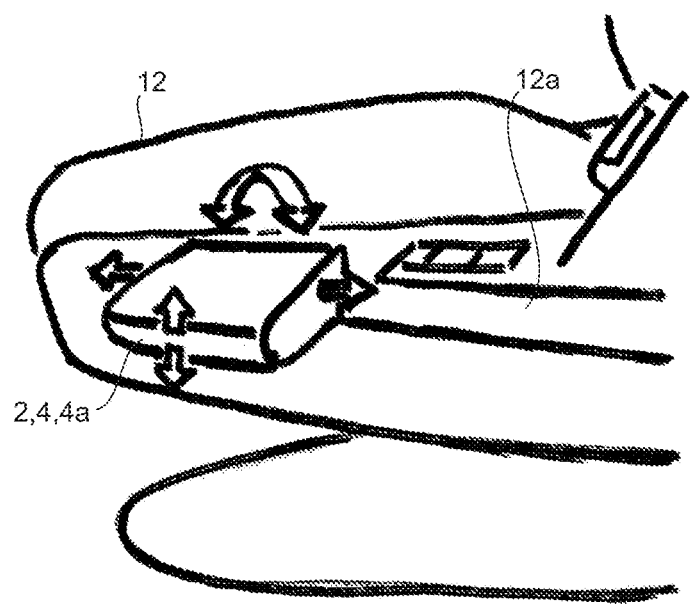
FIG. 5 shows a side view of a seat with an operating device according to a further embodiment.

While in FIG. 1 a seat with only one multifunction operating element (4) is shown, FIGS. 4 and 5 show an embodiment in which the seat (1) has two multifunction operating elements (4). In this case, the first multifunction operating element (4a) is arranged on the seat cushion section (12) and the second multifunction operating element (4b) is arranged on the armrest (15). In the case of two existing multifunction operating elements (4, 4a, 4b), both multifunction operating elements (4, 4a, 4b) may have the same operating levels (6) with the associated functions (8) or different operating levels (6).

The respective multifunction operating element (4) can be moved in six switching directions (7, 7a-7f), wherein the multifunction operating element (4) has three axes of movement (X, Y, Z).

This is shown in FIGS. 2a to 2d. Two opposite switching directions (7) are oriented along a movement axis (X, Y, Z), respectively.

Figure 2:
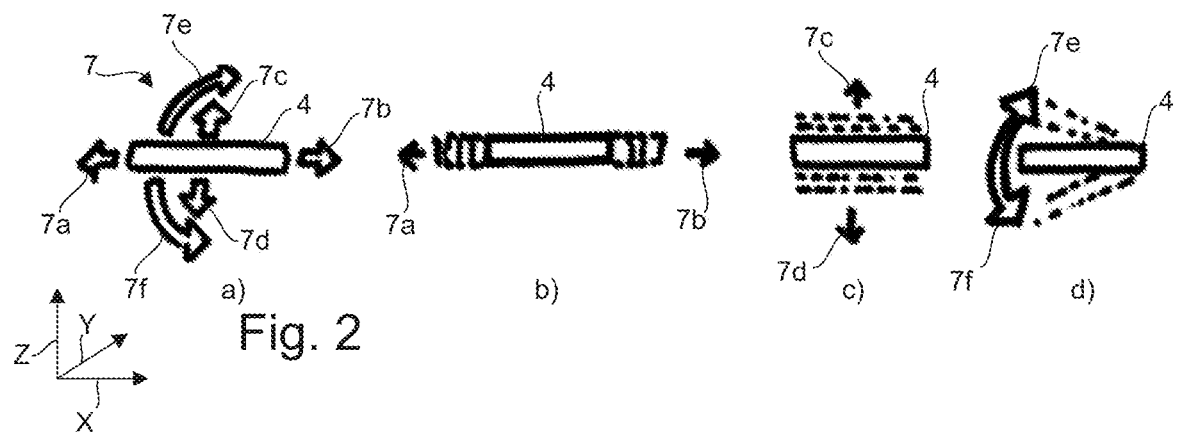
FIGS. 2 a-d show a side view of the multifunction operating element.

FIG. 2b shows a first (7a) and a second switching direction (7b) of a translational movement of the multifunction operating element (4) along a first axis of movement (X) in opposite directions. The multifunction operating element (4) can thus be moved by pulling or pushing along the first (7a) or second switching direction (7b). The first movement axis (X) extends along the horizontal longitudinal direction (X1) of the seat (1).

The third (7c) and the fourth switching direction (7d) correspond to a translational movement of the multifunction operating element (4) along a second movement axis (Z) in respectively opposite directions.

Alternatively, the third (7c) and the fourth switching direction (7d) may correspond to a rotational movement of the multifunction operating element (4) about the first movement axis (X) in opposite directions. The second movement axis (Z) extends along the height direction (Z1) of the seat and is perpendicular to the first movement axis (X). Both a translational movement of the multifunction operating element along the second movement axis (Z) and a rotational movement of the multifunction operating element about the first movement axis (X) means a movement of the multifunction operating element (4) up or down for the person in the seat. The multifunction operating element (4) is connected to the seat cushion section (12, 12a) or the armrest (15, 15a) by means of a joint.

The fifth (7e) and sixth switching direction (7f) correspond to a rotational movement of the multifunction operating element (4) about the third axis of movement (Y) in opposite directions, respectively. The third movement axis (Y) extends along the width direction (Y1) of the seat (1) and is perpendicular to the first movement axis (X) and the second movement axis (Z).

Figure 3:
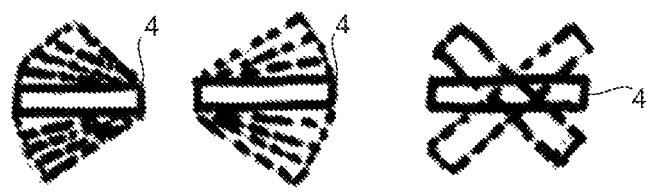
FIGS. 3 a-c show a side view of the multifunction operating element according to further embodiments.

The pivot point may be arranged centrally, off-centre of the multifunction operating element (4), as shown in FIG. 3c. Depending on the choice of the pivot point, a certain rotational movement of the multifunction operating element (4) results.

Alternatively, the pivot point could be located at a front end of the multifunction operating element (4), as shown in FIG. 3a. In FIG. 3b, an embodiment is shown in which the pivot point is arranged at the rear end of the multifunction operating element (4).

Figure 11:
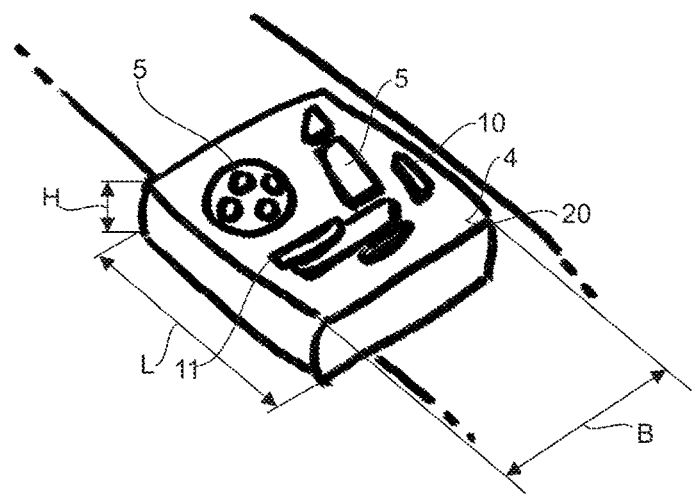
FIG. 11 shows a view of the multifunction operating element according to a further embodiment.

The one selection element (5) is arranged on a surface of the tabular multifunction operating element (4). In FIG. 8, various possible surfaces are shown. In FIG. 8a, the selection element (5) is arranged on the surface, which is bounded by the length (L) and the width (B) of the multifunction operating element (4). In FIG. 8b, the selection element (5) is arranged on the surface, which is bounded by the height (H) and the length (L) of the multifunction operating element (4). In FIG. 8c, the selection element (5) is arranged on the surface, which is bounded by the height (H) and the width (B) of the multifunction operating element (4). The selection element (5) may be a multi-stage switch or button. For example, a multi-stage slide switch is shown in FIGS. 8a to 8c. FIG. 11 shows a cross-shaped rocker switch. Furthermore, the multifunction operating element (4) may be equipped with haptic elements (9) and/or a grip layer (20).

FIGS. 10 and 11 show an embodiment in which a display device (11) is arranged on the multifunction operating element (4). The selected operating levels and the selected functions can be displayed by means of such a display device.

Furthermore, the multifunction operating element (4) is provided with identification elements (10) by means of which the switching directions can be identified. Such identification elements (10) can be seen in FIGS. 7, 8, 9.

Figure 7:
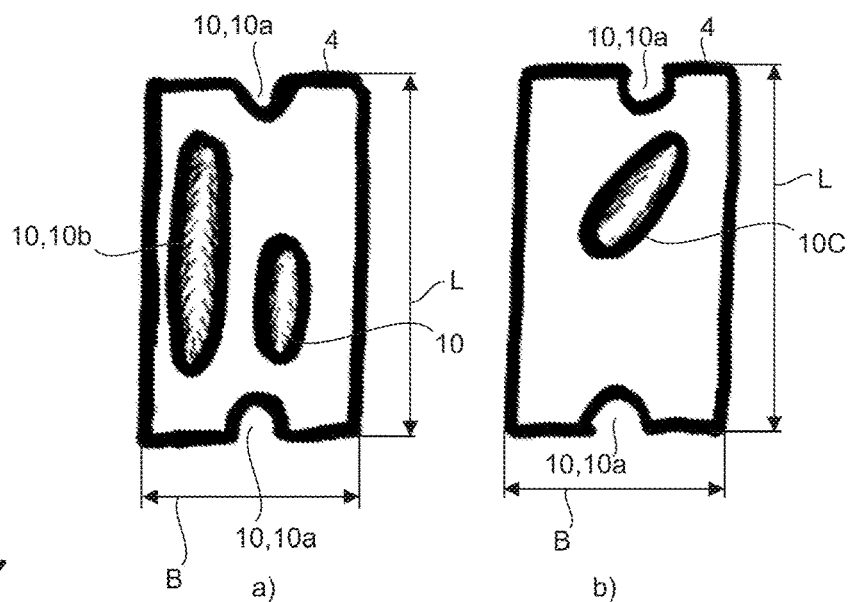
FIGS. 7 a-b show a plan view of the multifunction operating element according to further embodiments.

In FIG. 7, identification elements in the form of recesses (10a) at the front and rear ends of the multifunction operating element (4) are shown which can serve to identify the first and second switching directions (pull/push). Front and rear end are understood to mean the surfaces bounded by the height (H) and width (B) of the multifunction operating element (4).

Furthermore, recesses (10b) may be provided on the top and bottom of the multifunction operating element which can serve to identify the third and fourth switching directions (pull up/push down). The top and bottom are the opposing surfaces bounded by the length (L) and width (B) of the multifunction operating element (4).

In FIG. 7b, there is a recess (10c) for identifying the fifth (7e) and the sixth switching direction (7f) with a shape corresponding to the finger position during the rotational movement in the fifth and the sixth switching direction.

The respective identification elements (10) may also be illuminated.

A specific switching direction (7) of a function (8) of a first operating level (6) can be assigned to a change in a seat parameter (3) of a first element (1, 12, 13, 14, 15), which may be the entire seat (1) or a component (12, 13, 14, 15), with respect to a particular seating direction (X1, Y1, Z1). The same switching direction (7) of a function (8) of at least one further operating level (6) can be assigned to a change in a seat parameter (3) of a second element (1, 12, 13, 14, 15), which may be the entire seat (1) or a component (12, 13, 14, 15), with respect to a same seating direction (X1, Y1, Z1).

Furthermore, a movement of the multifunction operating element (4) in a switching direction (7) with respect to a movement axis (X, Y, Z) can cause a similar change in the position and/or orientation of the entire seat (1) or at least one component (12, 13, 14, 15) with respect to a seat direction (X1, Y1, Z1) parallel to the axes of movement (X, Y, Z).

FIG. 12 shows an operating device (2) according to one embodiment. The operating device (2) comprises a control unit (16), a touch screen (30) and a transmitting and receiving device (39), which are based on wireless technology, for example Bluetooth, NFC (Near Field Communication) technology, RFID (Radio Frequency identification) or Wireless LAN.

A user (40) may make an entry on the touch screen (30) by means of user inputs (32, 33). A first user input, which is preferably carried out as a swiping movement on the touch screen (30), represents a selection of a control panel (31), which is assigned to an operating level (6).

Due to an actuation (45) of the activation element (34) or due to an activation (33) by the multifunction operating element (4), a first activation signal (41) is initially transmitted to the touch screen 3, whereby the touch screen (30) is activated. Thereby, a first control panel (31, 31a) (not shown in FIG. 12) is displayed on the touch screen (30).

An operation of a particular function (8) can now be performed by a second user input (33) on the touch screen (30), which is typically a tapping movement. Likewise, such a second further user input (33) may be a movement of the multifunction operating element (4) along a switching direction (7).

On the basis of user inputs (32, 33) of the user (40), a first control signal (42) is transmitted from the touch screen (30) or the multifunction operating element (4) to the control unit 9. The control unit 9 is thereby informed as to which user input 5, 6 it is and how often or to what extent such a user input 5, 6 is made.

The control unit then sends a corresponding actuation signal (44) to the corresponding actuator (17) and/or the corresponding spring and/or cushioning device (18) and/or the corresponding seat comfort device (19).

Furthermore, after a selection of a control panel (31), an identification signal (38) can be transmitted from the touch screen (30) to the control unit (16), in particular after a predetermined first duration. After the control unit (16) has received the identification signal (38), the control unit sends a second activation signal (43) to at least one actuator (17) and/or spring and/or cushioning device (18) assigned to the operating level (6) and/or seat comfort device (19) to activate these devices (17, 18, 19) briefly and thus to provide the user with feedback about the currently selected operating level (6) or the seat parameter currently to be set.

It is also conceivable that only one connection from the control unit (16) to the actuator (17) and/or spring and/or cushioning device (18) and/or seat comfort device (19) is established, and based on the corresponding second user inputs (33), an activation actuation of these devices (17, 18, 19) by the control unit (16) is performed.

In addition, it is conceivable that upon actuation (45) of the activation element (34), a test signal (46) is transmitted from the activation element (34) to the control unit (16) as to whether the first control signal (42) originates from the touch screen (30).

Furthermore, the control unit (16) can send a deactivation signal (47) to the touch screen (30) after a predetermined second duration, as a result of which the touch screen can be automatically deactivated.

Finally, a mobile device (36) may be connected with the operating element (2) by means of a wireless technology, so that a data exchange is enabled. For this purpose, the operating element (2) comprises a corresponding transmitting and receiving device (39).

Figure 23:
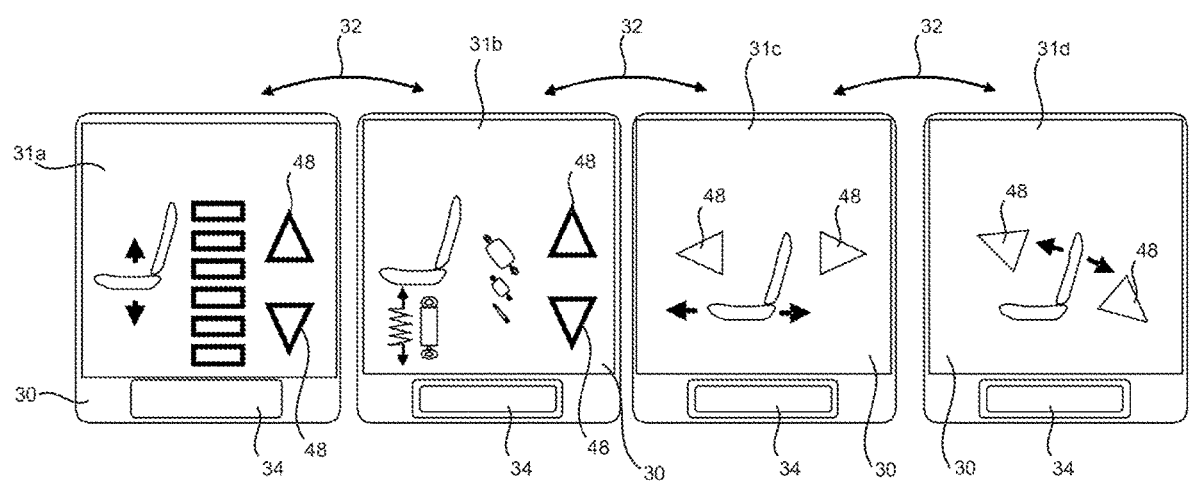
FIG. 23 shows a schematic representation of a switching between different control panels.

FIG. 23 shows a change or switching between different control panels (31) by means of a first user input (32), wherein a first control panel 31a, a second control panel 31b, a third control panel 31c and a fourth control panel 31d can be seen. Of course, fewer control panels 4 or more control panels 4 may be present, wherein at least two control panels 4 are advantageous.

As can further be seen, the control panels (31, 31a, 31b, 31c, 31d) are displayed by means of a touch screen (30), whereby in this case the activation element (34) is designed as part of the touch screen (30).

A seat height adjustment is displayed by the first control panel (31a), a vertical seat cushioning by the second control panel (31b), a longitudinal seat adjustment by the third control panel (31c) and a backrest tilt by the fourth control panel (31d). The corresponding operating levels are indicated by corresponding symbols.

By means of first user inputs (32) it is possible to switch between the control panels (31, 31a, 31b, 31c, 31d). In this case, the first user input (32) is a swiping movement.

The respective control panels (31, 31a, 31b, 31c, 31d) have at least one control sub-panel (48), which is designed as a sensitive key area. A corresponding input can be made by means of a second user input (33), which may be a tapping movement or else a swiping movement.

Figure 24:
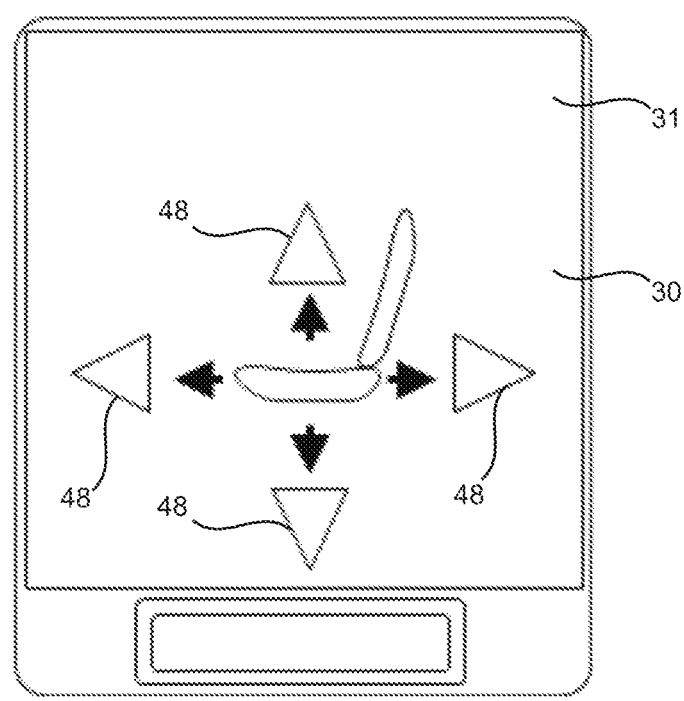
FIG. 24 shows an alternative representation of a control panel.

FIG. 24 shows an alternative representation of a control panel (31) in which a plurality of seat parameters belonging to different components can be set in a control panel. In the present case, this is a seat height setting, represented by the up and down arrows, and a seat longitudinal adjustment, represented by the arrows to the left and to the right.

In FIGS. 14 to 22, corresponding functions with the associated switching directions are shown according to one embodiment. Table 1 gives an overview of this.

According to FIG. 14a, the first (7a) and second (7b) switching direction (push-pull, shift) of the seat longitudinal adjustment can be seen in the operating level entire seat (1). When "pushing", the entire seat (1) moves forward. When "pulling", the entire seat (1) moves backwards.

According to FIG. 14b, in the operating level entire seat (1), the third (7c) and fourth (7d) switching direction (press down/press up; push-pull) are assigned to the seat height setting. When "pushing up (pull)", the entire seat (1) moves upwards. When "pushing down (push)", the entire seat (1) moves down.

Figure 15:
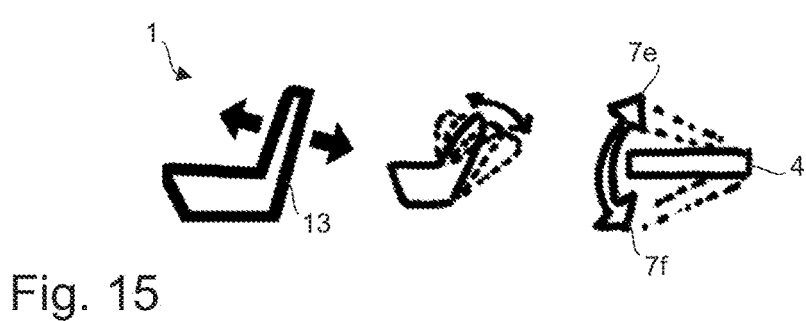
Figure 16:
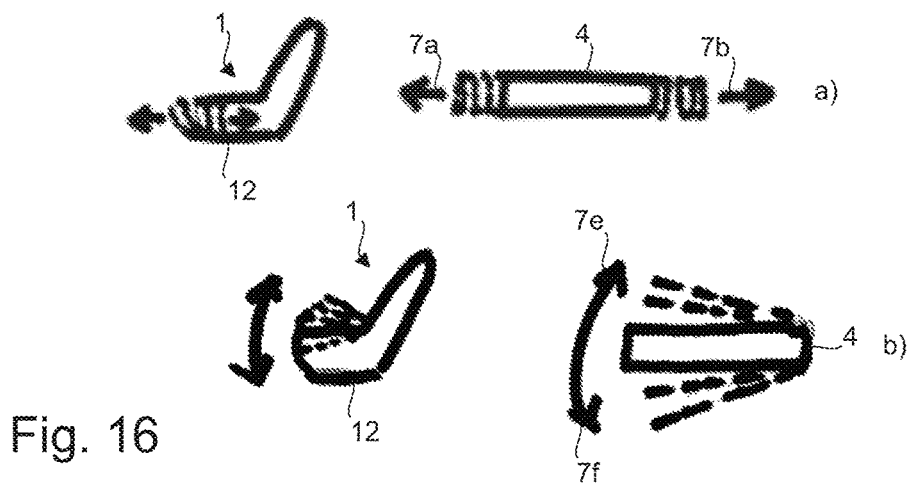

According to FIG. 15, in the operating level entire seat (1) or backrest (13), the fifth (7e) and sixth (7f) switching direction (tilt grip (flip)) are assigned to the backrest inclination setting or the entire seat inclination setting. When "tilting backwards", the backrest (13)/the entire seat (1) tilts backwards. When "tilting forwards", the backrest (13)/the entire seat (1) tilts forward.

According to FIG. 16a, in the operating level seat cushion section (12) the first (7a) and second (7b) switching direction (push-pull, shift) are assigned to the seat section longitudinal adjustment. When "pushing", the seat cushion length becomes longer. When "pulling", the seat cushion length becomes shorter.

According to FIG. 16b, in the operating level seat cushion section (12), the fifth (7e) and sixth (7f) switching direction (tilt grip (flip)) are assigned the seat section tilt setting. When "tilting backwards", the seat cushion section (12) tilts backwards. When "tilting forwards", the seat cushion section (12) tilts forward.

Figure 17:
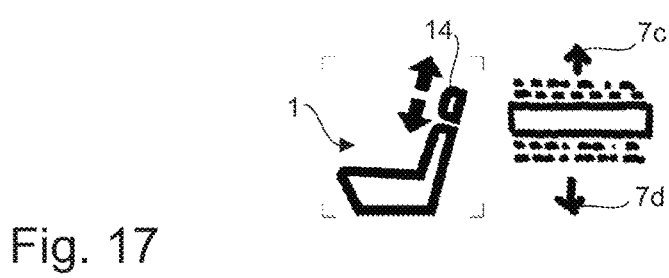

According to FIG. 17, in the operating level headrest (14), the third (7c) and fourth (7d) switching direction (press down/press up; push-pull) are assigned to the headrest height setting. When "pulling up (pull)", the headrest (14) moves upwards. When "pushing down (push)", the headrest (14) moves down.

According to FIG. 18a, in the operating level spring and/or cushioning device (18), the third (7c) and fourth (7d) switching direction (press button down/press button up; push-pull) is assigned to the spring and/or cushioning characteristic. When "pulling up (pull)", the spring and/or cushioning characteristic becomes harder. When "pushing down (push)", the spring and/or cushioning characteristic becomes softer. The actuation in the third (7c) and fourth (7d) switching direction can take place in several stages, i.e. a further actuation in the same direction makes the spring and/or cushioning characteristic even harder or softer.

According to FIG. 18b, the operating level spring and/or cushioning device (18) is assigned the first (7a) and second (7b) switching direction (push-pull, shift) of the X-direction. When "pushing", the spring and/or cushioning device (18) is turned on. When "pulling", the spring and/or cushioning device (18) is turned off.

According to FIG. 19a, in the operating level seat comfort device (19), lumbar support, the third (7c) and fourth (7d) switching direction (press button down/press button up; push-pull) are assigned to the displacement of the lumbar support peak curvature. When "pulling up (pull)", the lumbar support peak curvature is shifted upward. When "pushing down (push)", the lumbar support peak curvature is shifted down.

According to FIG. 19b, in the operating level seat comfort device (19), lumbar support, the first (7a) and second (7b) switching direction (push-pull, shift) are associated with the setting of the curvature of the lumbar support. When "pushing", the curvature of the lumbar support becomes stronger. When "pulling", the curvature of the lumbar support becomes slighter.

According to FIG. 20, in the operating level seat comfort device (19), side bolsters of the backrest, side bolsters of the seat section (12), the third (7c) and fourth (7d) switching direction (press grip down/press grip up, push-pull), are assigned to the setting of the side bolsters of the backrest (13), or the side bolsters of the seat section (12). When "pulling up", the side bolsters in the backrest (13) or seat cushion section (12) become narrower. When "pushing down", the side bolsters in the backrest (13) or seat cushion section (12) become wider.

Figure 21:
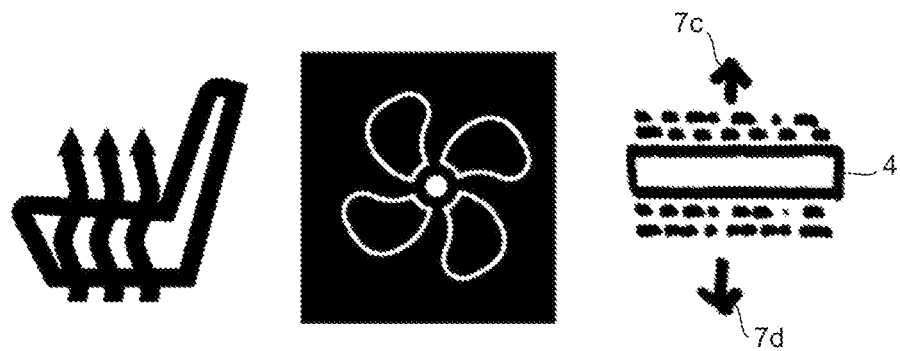

According to FIG. 21, in the operating level seat comfort device (19), seat air conditioning (seat heating, seat ventilation), the third (7c) and fourth (7d) switching direction (push grip down/pull grip up, push-pull) are assigned to the setting of the seat comfort device. By pulling or pushing (push-pull), the seat heating, seat ventilation is switched on, gradually adjusted and switched off. The following stages are planned: Pulling—Heating (Ventilation) on, further pulling—Heating level (Ventilation level) higher, push: Heating level (Ventilation level) lower, Additional pushing—Heating (Ventilation) off.

Figure 22:
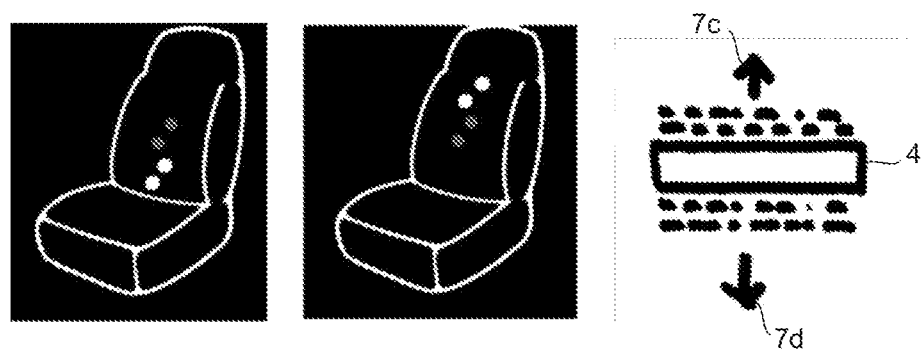

According to FIG. 22, in the operating level seat comfort device (19), massage device, the third (7c) and fourth (7d) switching direction (push grip down/pull grip up; push-pull) are assigned to the setting of the massage device. By pulling or pushing (push-pull), the massage function is switched on, gradually adjusted, and switched off.

5 Selection element
6 Operating level
7 Switching direction
7a First switching direction
7b Second switching direction
7c Third switching direction
7d Fourth switching direction
7e Fifth switching direction
7f Sixth switching direction
8 Function
9 Haptic elements
10 Identification element
10a Recess

TABLE 1

| Operating level | Function | Switching direction | FIG. |
|---|---|---|---|
| Entire seat (1) | Seat forward/backward Longitudinal direction (X1) | first (7a)/second (7b) | 14a |
| Entire seat (1) | Seat up/down Height direction (Y1) | third (7c)/fourth (7d) | 14b |
| Entire seat (1) | Tilt seat with respect to axis along width direction (Z1) | fifth (7e)/sixth (7f) | — |
| Backrest (13) | Tilt backrest | fifth (7e)/sixth (7f) | 15 |
| Seat section (12) | Seat cushion length | first (7a)/second (7b) | 16a |
| Seat section (12) | Seat cushion tilt setting | fifth (7e)/sixth (7f) | 16b |
| Headrest (14) | Headrest forward/backward Longitudinal direction (X1) | first (7a)/second (7b) | 17 |
| Headrest (14) | Headrest up/down Height direction (Y1) | third (7c)/fourth (7d) | — |
| Headrest (14) | Tilt headrest with respect to axis along width direction (Z1) | fifth (7e)/sixth (7f) | — |
| Spring and/or cushioning device (18) in X1, Y1, Z1 direction | Spring and/or cushioning characteristic becomes softer or harder | third (7c)/fourth (7d) multi-stage | 18a |
| Spring and/or cushioning device (18) in X1, Y1, Z1 direction | Switch spring and/or cushioning device on or off | first (7a)/second (7b) | 18b |
| Seat comfort device (19) lumbar support | Adjustment of the curvature of the lumbar support | first (7a)/second (7b) | 19b |
| Seat comfort device (19) lumbar support | Lumbar support peak curvature up down | third (7c)/fourth (7d) | 19a |
| Seat comfort device (19), side bolsters of the backrest (13), side bolsters of the seat section (12) | Setting the side bolsters of the backrest (13), side bolsters of the seat cushion section (12) | third (7c)/fourth (7d) | 20 |
| Seat comfort device (19), seat heating | Switch seat heating on or off or set seat heating | third (7c)/fourth (7d) multi-stage | 21 |
| Seat comfort device (19), seat ventilation | Switch seat ventilation on or off or set seat ventilation | third (7c)/fourth (7d) multi-stage | 21 |
| Seating comfort device (19), massage device | Switch massage device on or off or set massage device | third (7c)/fourth (7d) multi-stage | 22 |

All the features disclosed in the application documents are claimed as being essential to the invention provided that, individually or in combination, they are novel over the prior art.

LIST OF REFERENCE SIGNS

1 Seat
2 Operating device
3 Seat parameters
4 Multifunction operating element
4a First multifunction operating element
4b Second multifunction operating element
10b Recess
10c Recess
11 Display device
12 Seat cushion section
12a Lateral section of the seat section
13 Backrest
14 Headrest
15 Armrest
15a Lateral section of the armrest
16 Control unit
17 Actuator
18 Spring and/or cushioning device
19 Seat comfort device 20 Grip layer
30 Touch screen
31 Control panel
31a First control panel
31b Second control panel
31c Third control panel
31d Fourth control panel
32 First user input
33 Second user input
34 Activation element
36 Mobile device
37 Data exchange
38 Identification signal
39 Transmitting and receiving device
40 User
41 First activation signal
42 First control signal
43 Second activation signal
44 Actuation signal
45 Actuation of the activation element
46 Test signal
47 Deactivation signal
48 Control sub-panel
X First movement axis
Y Third movement axis
Z Second movement axis
X1 Longitudinal direction
Y1 Width direction
Z1 Height direction
L Length of the multifunction operating element
B Width of the multifunction operating element
H Height of the multifunction operating element

What is claimed is:

1. An operating device for setting seat parameters of a seat the operating device comprising:
   a multifunction operating element mechanically connected to the seat, the multifunction operating element having a touch screen arranged on a first surface of the multifunction operating element,
   wherein the touch screen enables a selection of an operating level,
   wherein the multifunction operating element is moveable in at least five switching directions, and
   wherein each switching direction of the at least five switching directions is assignable to a particular function associated with the selected operating level and changing a seat parameter.

2. The operating device according to claim 1, wherein the operating device comprises two or more multifunction operating elements.

3. The operating device according to claim 1,
   wherein the multifunction operating element is moveable in six switching directions,
   wherein the multifunction operating element has three axes of movement,
   wherein a first and a second switching direction correspond to a translational movement of the multifunction operating element along a first axis of movement in a first and a second direction, respectively,
   wherein a third and a fourth switching direction correspond to a translational movement of the multifunction operating element along a second axis of movement in a third and a fourth direction, respectively or a first and a second rotational movement of the multifunction operating element about the first axis of movement, and
   wherein a fifth and a sixth switching direction correspond to a third and a fourth rotational movement of the multifunction operating element about a third axis of movement.

4. The operating device according to claim 1, wherein both an operating level is selectable and a specific function is operateable directly by at least one selection element.

5. The operating device according to claim 1,
   wherein the touch screen displays at least two control panels for selection by a user,
   wherein a first control panel of the at least two control panels represents the operating level,
   wherein the first control panel is selectable by at least one first user input,
   wherein the at least two control panels are arranged in a fixed sequence,
   wherein the touch screen indicates a single control panel in each case, and
   wherein the at least one first user input is a swiping or a tapping movement.

6. The operating device according to claim 1,
   wherein the operating device comprises a control unit receiving a control signal from the multifunction operating element, and
   wherein the control unit controls at least one of at least one actuator of the seat, at least one spring of the seat, a cushioning device of the seat, or at least one seat comfort device.

7. The operating device according to claim 1,
   wherein, after the selection of the operating level, an identification signal is transmittable from the touch screen to a control unit after a predetermined first duration, and
   wherein the control unit briefly activates at least one actuator assigned to the operating level after receipt of the identification signal.

8. The operating device according to claim 5,
   wherein the operating device is deactivatable manually or automatically after a predetermined first duration,
   wherein the operating device is activatable by a movement of at least one of the multifunction operating element or an activation element, and
   wherein, after a predetermined second duration, the touch screen displays the first control panel.

9. The operating device according to claim 1,
   wherein, after selecting the operating level or actuation of a function by the multifunction operating element, a confirmation signal is presentable to a user, and
   wherein the confirmation signal is a haptic signal.

10. The operating device according to claim 1, wherein the operating device is connectable with a mobile device by a wireless technology, so that a data exchange is enabled.

11. The operating device according to claim 1,
    wherein the multifunction operating element is designed in a tabular form,
    wherein at least one of the multifunction operating element is equipped with at least one of haptic elements or a grip layer, or an illumination is provided on the multifunction operating element.

12. The operating device according to claim 1, wherein the multifunction operating element is provided with at least one identification element that enables identification of the at least five switching directions.

13. A seat with an operating device for setting seat parameters according to claim 1.

14. The seat according to claim 13, wherein the multifunction operating element is arranged on at least one of a seat section or an armrest.

15. The seat according to claim 13, wherein an actuator changes one or more seat parameters relating to at least one of a position or an orientation of at least one component of the seat.

16. The seat according to claim 14, wherein the multifunction operating element is arranged on a lateral section of the seat.

17. The seat according to claim 1,
wherein a first set of seat functions are controllable by moving the multifunction operating element in a first direction when a first operating level is selected, and
wherein a second set of seat functions are controllable by moving the multifunction operating element in the first direction when a second operating level is selected.

* * * * *